(12) United States Patent
Noda et al.

(10) Patent No.: US 7,164,525 B2
(45) Date of Patent: Jan. 16, 2007

(54) WAVELENGTH CONVERTING DEVICES

(75) Inventors: Ken-ichi Noda, Nagoya (JP); Makoto Iwai, Kasugai (JP); Takashi Yoshino, Ama-gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/223,227

(22) Filed: Sep. 9, 2005

(65) Prior Publication Data

US 2006/0001948 A1   Jan. 5, 2006

Related U.S. Application Data

(63) Continuation of application No. PCT/JP04/02965, filed on Mar. 8, 2004.

(30) Foreign Application Priority Data

Mar. 11, 2003  (JP) ............................ 2003-064437
Feb. 5, 2004   (JP) ............................ 2004-029546

(51) Int. Cl.
   *G02F 1/355*  (2006.01)
(52) U.S. Cl. .................................... 359/326
(58) Field of Classification Search ......... 359/326–332
   See application file for complete search history.

(56) References Cited

U.S. PATENT DOCUMENTS

| | | | | |
|---|---|---|---|---|
| 3,617,918 A | * | 11/1971 | Rabin | 359/326 |
| 5,058,970 A | * | 10/1991 | Schildkraut et al. | 359/328 |
| 5,182,666 A | * | 1/1993 | Kawabe | 359/107 |
| 5,325,229 A | * | 6/1994 | Millard | 359/330 |
| 5,353,292 A | * | 10/1994 | Motegi | 372/21 |
| 5,381,430 A | * | 1/1995 | Nozaki et al. | 372/21 |
| 5,581,396 A | | 12/1996 | Kubota et al. | 359/332 |
| 5,737,117 A | | 4/1998 | Imaeda et al. | 359/332 |
| 6,414,784 B1 | * | 7/2002 | Oosako et al. | 359/326 |
| 2001/0055453 A1 | | 12/2001 | Mizuuchi et al. | 385/122 |

FOREIGN PATENT DOCUMENTS

| | | |
|---|---|---|
| JP | 08-006083 A1 | 1/1996 |
| JP | 08-333199 A1 | 12/1996 |
| JP | 08-339002 A1 | 12/1996 |
| JP | 2001-147337 A1 | 5/2001 |
| JP | 2002-250949 A1 | 9/2002 |
| JP | 2003-131182 A1 | 5/2003 |

OTHER PUBLICATIONS

Masatoshi Adachi et al. "Growth and Optical Properties of Potassium Lithium Niobate (KLN) Tungsten-Bronze Crystals, Films and Fibers", Proceeding of International Symposium on Laser and Nonlinear Optical Materials, 1997, No. 161, pp. 196-202, Nov. 1997.

* cited by examiner

*Primary Examiner*—John D. Lee
(74) *Attorney, Agent, or Firm*—Burr & Brown

(57) ABSTRACT

Wavelength conversion devices for converting fundamental waves to light of a different wavelength are provided. The devices have a wavelength converting layer comprising a plate-shaped body of a non-linear optical crystal having a first main face and a second main face. A supporting body is joined with the first main face of the wavelength converting layer. An additional supporting body may also be joined with the second main face of the wavelength converting layer.

8 Claims, 1 Drawing Sheet

(a)

(b)

WAVELENGTH CONVERTING DEVICES

CROSS REFERENCE TO RELATED APPLICATIONS

This application is a continuation of International Application No. PCT/JP2004/002965, having an international filing date of Mar. 8, 2004, which designated the United States, the entirety of which is incorporated herein by reference.

This application also claims the benefit of Japanese Application No. 2003-064437, filed Mar. 11, 2003, and Japanese Application No. 2004-029546, filed Feb. 5, 2004, the entireties of which are incorporated herein by reference.

BACKGROUND OF THE INVENTION

1. Field of the Invention

The present invention relates to a wavelength converting device suitable for a blue light source device or the like.

2. Related Art Statement

A second harmonic wave generating device with reduced optical damage and without the necessity of quasi-phase matching and a high precision control of domains was proposed in Japanese patent publication 8-339, 002A. According to the publication, it is produced a substrate of a single crystal of potassium lithium niobate or potassium lithium niobate partially substituted with tantalum is produced by a micro pull-down method, and an optical waveguide made of the same kind of material as the substrate is produced on the substrate.

Further, potassium lithium niobate having an absorption coefficient of 0.3 $cm^{-1}$ or lower in a wavelength range of blue to green light is known (Japanese Patent publication 8-333199 A: Proceeding of International Symposium on Laser and Nonlinear Optical Materials, 1997, T8.4, M. Adachi et al).

Japanese patent publication 2002-250, 949A further discloses that it is known to adhere a substrate to be processed made of a non-linear optical crystal onto a supporting body and the substrate is then mechanically processed to form an optical waveguide. According to the publication, a substrate made of lithium niobate single crystal is used to form an optical waveguide.

When it was tried to irradiate blue light from a second harmonic wave generating device using potassium lithium niobate crystal, however, the output power of the blue light fluctuated when the input power of a fundamental wave is elevated to a value of 1 W or larger. That is, the irradiated blue light was observed to prove that irregular cycles each including periods of increase and decrease of the light intensity were repeated on a non-periodic basis.

Further, also in the second harmonic wave generating device using lithium niobate single crystal, it was found that irregular cycles each including periods of increase and decrease of the light intensity were repeatedly observed, when the power of fundamental wave oscillated from a light source is 500 mW or larger.

SUMMARY OF THE INVENTION

An object of the present invention is to prevent the fluctuation of the output power of converted light (output power of light having a wavelength after conversion) oscillated from a wavelength converting device using a non-linear optical crystal.

The present invention provides a wavelength converting device comprising a wavelength converting layer comprising a plate-shaped body of a non-linear optical crystal having first and second main faces and a supporting body joined with the first main face of the wavelength converting layer.

The present inventors have studied the cause of the fluctuation of the output power of the converted light described above, and reached the following discovery, which will be described below mainly referring to the case where blue light is oscillated from a second harmonic wave generating device using a potassium lithium niobate crystal.

A potassium lithium niobate crystal has a small absorption band for blue light. A part of the blue light oscillated from the potassium lithium niobate crystal is thus absorbed inside the device to generate heat in the device itself. The conditions for phase matching (phase matching wavelength) the potassium lithium niobate crystal is fluctuated depending on the temperature of the device. As the temperature of the device is elevated due to the heat generated therein as described above, the phase matching wavelength is thereby changed to lower the oscillation efficiency and output of the blue light. As the output of the blue light is lowered, the heat generation inside of the device is reduced so that the temperature of the device is lowered. As a result, the phase matching condition is turned to the initial condition so that the oscillation efficiency and output power of the blue light from the device are increased. It is considered that the cycles are repeated in the device so that the output of the blue light from the device is fluctuated and unstable.

This kind of fluctuation of the output power has not been considered problematic, because the above cycles have not been found in prior wavelength converting devices whose power of the fundamental wave is relatively low.

The present inventors have tried to join a supporting body with the main face of a wavelength converting layer made of a plate of a non-linear optical crystal, based on the discovery of the cycles of the output power of the converted light described above. The inventors thus have found that the thermal uniformity and stability of light in the direction of the guiding wave can be improved to stabilize the output power of the converted light. The present invention is based on the discovery.

The following additional effect can be obtained. That is, a plate of a non-linear optical crystal is joined with a supporting body to fabricate a wavelength converting device, so that the strength of the device is improved and the handling of the device is facilitated.

DETAILED DESCRIPTION OF THE INVENTION

The non-linear optical crystal is not particularly limited as far as the crystal is capable of converting the wavelength of fundamental wave. The crystal is preferably lithium niobate, lithium tantalate, a solid solution of lithium niobate-lithium tantalate, potassium lithium niobate ($K_3Li_2Nb_5O_{15}$), potassium lithium tantalate ($K_3Li_2Ta_5O_{15}$), a solid solution of potassium lithium niobate and potassium lithium tantalate, potassium niobate, titanyl calcium phosphate, barium borate, or lithium borate.

The non-linear optical crystal may contain one or more metal element(s) selected from the group consisting of magnesium (Mg), zinc (Zn), scandium (Sc) and indium (In) for, for example, further improving the resistance against optical damage.

Further, the non-linear optical crystal may contain a rare earth element as a dopant capable of acting as an additive for laser oscillation, for example. The rare earth element is preferably Nd, Er, Tm, Ho, Dy or Pr. Further, one or more element in the non-linear optical crystal may be replaced with another element as long as the crystal structure is preserved.

The shape of the plate-shaped body of non-linear optical crystal is not particularly limited, as long as the plate-shaped body is capable of functioning as a guiding layer of light. Specifically, the shape of the plate-shaped body may be a flat plate or curved plate. Further, a channel waveguide may be or may not be formed in the non-linear optical crystal by means of ion exchange, ion diffusion, mechanical processing or the like.

The plate-shaped body has first and second main faces. A main face means each of two faces of the plate-shaped body having a surface area larger than those of the other faces.

Figure 1:
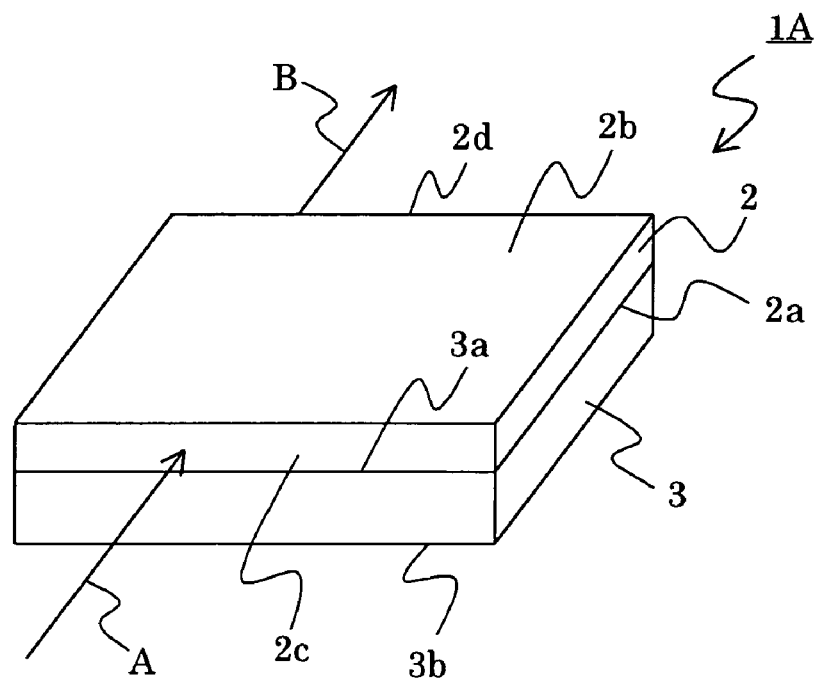
FIG. 1(a) is a perspective view showing a wavelength converting device 1A according to one embodiment of the present invention, having a wavelength converting layer 2 made of a plate-shaped body and a supporting body 3 joined thereto.
FIG. 1(b) is a perspective view showing a wavelength converting device 1B according to another embodiment of the present invention, having a wavelength converting layer 2 made of a plate-shaped body and supporting bodies 3A and 3B joined thereto.
Figure 1:
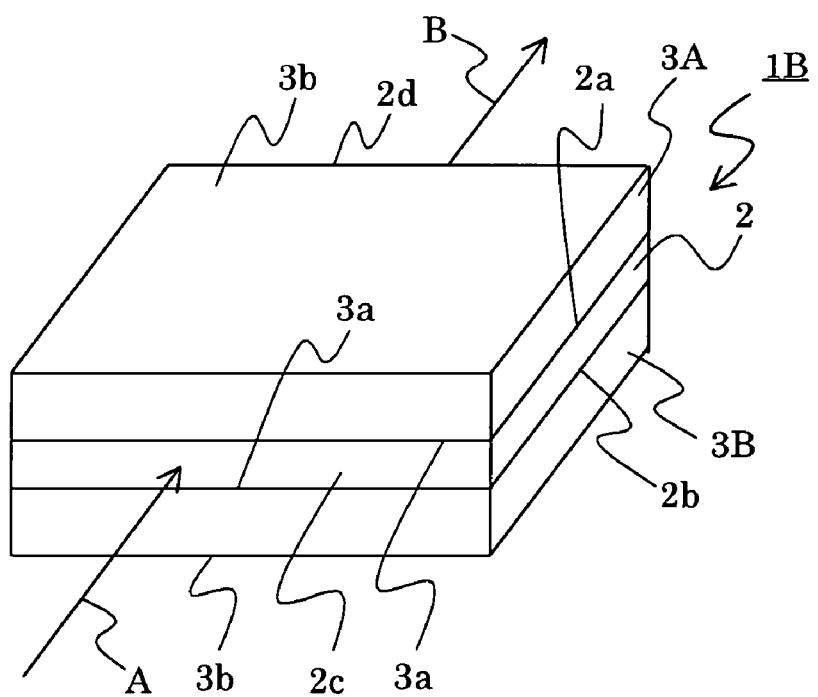

According to one embodiment of the present invention, the supporting body is joined with the first main face and not joined with the second main face of the wavelength converting layer. FIG. 1. (a) shows a wavelength converting device 1A according to this embodiment of the present invention. The wavelength converting device 1A has a wavelength converting layer 2 made of a flat plate and a supporting body 3 joined with the wavelength converting layer. The plate-shaped body 2 forming the wavelength converting layer has a first end face 2c, a second end face 2d, a first main face 2a and a second main face 2b. The supporting body 3 is joined with the first main face 2a. Fundamental light is irradiated into the first end face 2c as an arrow "A" so that converted light is oscillated from the second end face 2d. 3a represents a joined face and 3b represents a back face.

According to the present invention, the supporting body 3 is joined with the wavelength converting layer 2 so that the temperature fluctuation of the layer 2 is reduced and the thermal uniformity and stability in the direction of the light guide can be improved. It is considered that the fluctuation of the output power of the converted light is thereby prevented. The upper limit of the output power of the incident light is thereby raised while preventing the fluctuation of output power of the converted light, compared with prior devices.

According to a preferred embodiment, another supporting body is joined with the second main face of the plate-shaped body. FIG. 1(b) shows a device 1B according to this embodiment. The device 1B has the substrate 2 and a supporting body 3A joined with the first main face 2a of the plate-shaped body 2 and an additional supporting body 3B is joined with the second main face 2b of the plate-shaped body 2.

According to the present embodiment, the wavelength converting layer is provided between a pair of the supporting bodies. It is thus possible to reduce the thermal distribution in the direction of thickness of the wavelength converting layer. As a result, the upper limit of the output power of the incident light can be further raised while preventing the fluctuation of output power of the converted light.

The materials of the supporting bodies 3A and 3B are not particularly limited and may be lithium niobate, lithium tantalate, magnesium oxide, aluminum oxide, strontium titanate or a glass.

The thermal conductivity of the material forming each of the supporting bodies is preferably 0.1 W/m·K or higher, and more preferably, 1 W/m·K or higher.

The thermal expansion coefficient "C" of the non-linear optical crystal and the thermal expansion coefficient "S" of the material forming each of the supporting bodies are preferably close. It is thus possible to obtain stable oscillation property and excellent reliability of high frequency wave and excellent reliability when the inventive device is used under high or low temperature condition other than room temperature. From this viewpoint, the ratio (S/C) of the thermal expansion coefficient "S" of each supporting body with respect to the thermal expansion coefficient "C" of the non-linear optical crystal is preferably 0.6 to 1.4, and more preferably, 0.85 to 1.15.

Although the material of each of the supporting bodies may not be transparent, the material is preferably transparent in a wavelength band for use for preventing the absorption of light.

The thickness and dimensions of each supporting body is appropriately selected depending on the material of the supporting body, and output power of the light source used. Further, when both of the supporting bodies 3A and 3B are provided, the materials of the supporting bodies 3A and 3B may be the same or different from each other.

The method for joining the supporting bodies 3A and 3B and the plate-shaped body each made of a non-linear optical crystal is not particularly limited. When they are joined with each other using an adhesive, the adhesives include the following:

(1) Organic adhesive: for example, epoxy resin, acrylic resin, polyurethane resin, polyimide resin or silicone resin; and (2) Inorganic resin: for example, low melting point glass, water glass.

Further, the substrate 2 and supporting bodies 3A and 3B may be joined with each other by means of diffusion bonding, press bonding, or optical contact.

The wavelength converting device according to the present invention is not limited to a second harmonic wave generating device and may be a third or fourth harmonic wave generating device, a sum frequency generating device or a difference frequency generating device. Further, the inventive device is particularly suitable for generating light having a wavelength of 390 nm to 540 nm. The device generating light of this kind of short wavelength may be used in a variety of applications such as an optical disk memory device, medical use, optochemical use, various kinds of optical measurements or the like.

The inventive wavelength converting device may further have a refractive grating layer for fixing the wavelength of light incident into the optical waveguide layer and/or a temperature control means for controlling the temperature of the optical waveguide layer.

EXAMPLES

Example 1

A plate-shaped body 2 made of potassium lithium niobate, of Z-cut and having a length of 15 mm and width of 15 mm and thickness of 0.5 mm was prepared. The plate-shaped body was prepared by means of micro pull-down method. A supporting body 3 made of soda glass and having a length of 20 mm, a width of 20 mm and thickness of 1 mm was prepared. The joining faces of the substrate 2 and supporting body 3 were subjected to chemical machinery polishing to improve the flatness to a value of 0.5 µm or lower. An adhesive of thermosetting type was used to join them at 150° C. to obtain a joined sample "A." The thickness of the adhesive layer between the substrate 2 and supporting body 3 was about 0.5 µm. The thus obtained joined sample "A" was cut by a dicer to obtain a chip having a length of 3.5 mm. Both end faces of the chip were subjected to optical polishing. The resulting chip was further cut with a dicer to obtain a device 1A having a width of 2 mm, a thickness of 1.5 mm and a length of 3 mm.

The device 1A was used to oscillate a second harmonic wave. A mode locking titanium sapphire laser having a wavelength of 9.14 nm was used as the light source for the oscillating fundamental wave. A condenser lens having an NA of 0.25 and a working distance of 8.5 mm was used to condense into the device 1A. The phase matching was performed at 30° C. Even when the average output of the fundamental light source was elevated to 3 W, fluctuation of the output power of the harmonic wave with blue light (wavelength of 457 nm) was not observed and the device oscillated with stability.

Example 2

The joined sample "A" described in the example 1 was polished at another main face 2b (not joined) of the substrate 2 to obtain a joined sample "B" having a thickness of 1.3 mm. To the main face 2b (not joined) of the joined sample "B," a soda glass substrate 3B having a length of 20 mm, a width of 20 mm and a thickness of 1.2 mm was adhered using a ultraviolet light curable resin to obtain a device 1B having a thickness of 2.5 mm. The thickness of the adhesive layer of the ultraviolet light curable resin was about 5 µm. The device 1B was used to perform an experiment of wavelength conversion according to the same procedure as Example 1. As a result, even when the average output of the fundamental light source was elevated to 10 W, fluctuation of the output power of the harmonic wave with blue light (wavelength of 457 nm) was not observed and the device oscillated with stability.

Example 3

Devices were produced according to the same procedure as Example 1, except that the refractive indices of potassium lithium niobate crystal forming the plate-shaped body 2 so that the resulting devices can attain phase matching at −40, 0, 60, 100, 150 and 200° C., respectively, at a wavelength of 914 nm. The devices were held at the respective phase matching temperatures to perform experiments of wavelength conversion according to the same procedure as Example 1. As a result, even when the average output of the fundamental light source was elevated to 3 W, fluctuation of the output power of the harmonic wave with blue light (wavelength of 457 nm) was not observed and the device oscillated with stability.

Example 4

The device 1B produced in Example 2 was set in an internal resonator to oscillate blue light. Even when the average output of the fundamental light source was elevated to 10 W, fluctuation of the output power of the harmonic wave with blue light (wavelength of 457 nm) was not observed and the device oscillated with stability.

Example 5

The device 1A was produced according to the same procedure as Example 1, except that the supporting body 3 was composed of a Z-cut substrate of lithium niobate single crystal. The device 1A was subjected to experiment of wavelength conversion according to the same procedure as Example 1. As a result, even when the average output of the fundamental light source was elevated to 3 W, fluctuation of the output power of the harmonic wave with blue light (wavelength of 457 nm) was not observed and the device oscillated with stability.

Example 6

The device 1A was produced according to the same procedure as Example 1, except that the supporting body 3 was composed of a magnesium oxide substrate of (100) cut. The device 1A was subjected to experiment of wavelength conversion according to the same procedure as Example 1. As a result, even when the average output of the fundamental light source was elevated to 3 W, fluctuation of the output power of the harmonic wave with blue light (wavelength of 457 nm) was not observed and the device oscillated with stability.

Example 7

An X-cut substrate 2 having a diameter of 3 inch and a thickness of 0.5 mm and made of lithium niobate doped with 5 mol percent of MgO was prepared. The substrate 2 included a periodic reversed polarization structure formed therein. A supporting body 3A having a diameter of 3 inch, a thickness of 1 mm and made of X-cut lithium niobate was further prepared. An adhesive of thermal setting type was used to adhere the substrate 2 and supporting body 3A at 150° C. The thickness of the adhesive layer between the substrate 2 and supporting body 3A was about 0.5 µm. The main face 2b (not joined) was polished to obtain a joined sample "B" whose substrate 2 had a thickness of 3 µm. To the main face 2b (not joined) of the joined sample "B," a substrate 3B having a diameter of 3 inch and a thickness of 0.5 mm and made of X-cut lithium niobate was joined at 150° C. to obtain a device 1B. The thickness between the substrate 2 and supporting body 3B was about 0.5 mm. The joined sample "B" was cut by means of a dicer to obtain a chip having a width of 2 mm and a length of 10 mm. Both end faces of the chip were subjected to optical polishing to obtain a device 1B. The device 1B was used to perform an experiment of wavelength conversion according to the same procedure as the example 1. As a result, even when the average output of the fundamental light source was elevated to 1 W, fluctuation of the output power of the harmonic wave with blue light (wavelength of 457 nm) was not observed and the device oscillated with stability.

Comparative Example 1

A substrate 2 having a length of 15 mm, a width of 15 mm and a thickness of 0.5 mm and made of Z-cut lithium niobate was prepared by means of micro pull-down method. The substrate 2 was cut with a dicer to obtain a chip having a length of 3.5 mm. Both end faces of the chip were optically polished. The chip was further cut with a dicer to obtain a device having a width of 2 mm, a thickness of 1.5 mm and a length of 0.5 mm. The supporting body 3 was not joined with the device.

The device was used to oscillate second harmonic wave according to the same procedure as Example 1. When the output power of the fundamental wave exceeds 1 W, it was visually observed that the output power of blue ray (wavelength of 457 nm) was fluctuated on a non-periodic basis.

As described above, according to the present invention, it is possible to prevent the fluctuation of the output power of converted light oscillated from a wavelength converting device using a non-linear optical crystal.

The invention claimed is:

1. A wavelength converting device comprising:
    a wavelength converting layer comprising a plate-shaped body of a non-linear optical crystal and first and second main faces; and
    a transparent supporting body joined with said first main face of said wavelength converting layer via an adhesive bond including one of an organic adhesive and an inorganic resin, said transparent supporting body comprising one of lithium niobate, lithium tantalate, magnesium oxide, aluminum oxide and strontium titanate.

2. The wavelength converting device of claim 1, further comprising an additional transparent supporting body joined with said second main face of said wavelength converting layer via an adhesive bond including one of an organic adhesive and an inorganic resin, wherein said additional transparent supporting body comprises one of lithium niobate, lithium tantalate, magnesium oxide, aluminum oxide and strontium titanate.

3. The wavelength converting device of claim 1, wherein said transparent supporting body comprises a material having a thermal conductivity of 0.1 W/m·K or higher.

4. The wavelength converting device of claim 1, wherein said non-linear optical crystal comprises a crystal of tungsten bronze structure and comprising potassium and lithium elements.

5. The wavelength converting device of claim 1, wherein said non-linear optical crystal is selected from the group consisting of lithium niobate, lithium tantalate and lithium niobate-lithium tantalate solid solution.

6. The wavelength converting device of claim 1, wherein said wavelength converting layer is joined with said transparent supporting body only along said first main face thereof.

7. The wavelength converting device of claim 6, wherein said transparent supporting body has a width that is equal to a width of said wavelength converting layer along said first main face thereof.

8. The wavelength converting device of claim 1, further comprising a bonding layer interposed between said wavelength converting layer and said transparent supporting body.

* * * * *